E. F. BRANEN, Sr.
METHOD OF MAKING TIRE FILLERS.
APPLICATION FILED AUG. 9, 1920.
1,389,093.
Patented Aug. 30, 1921.
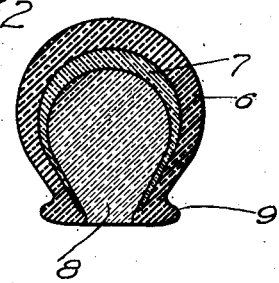
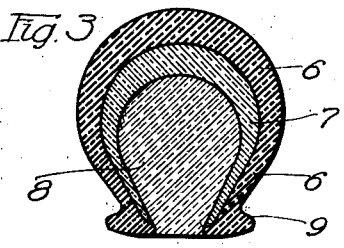
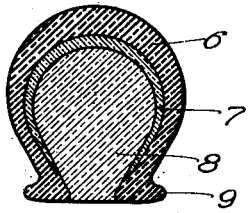
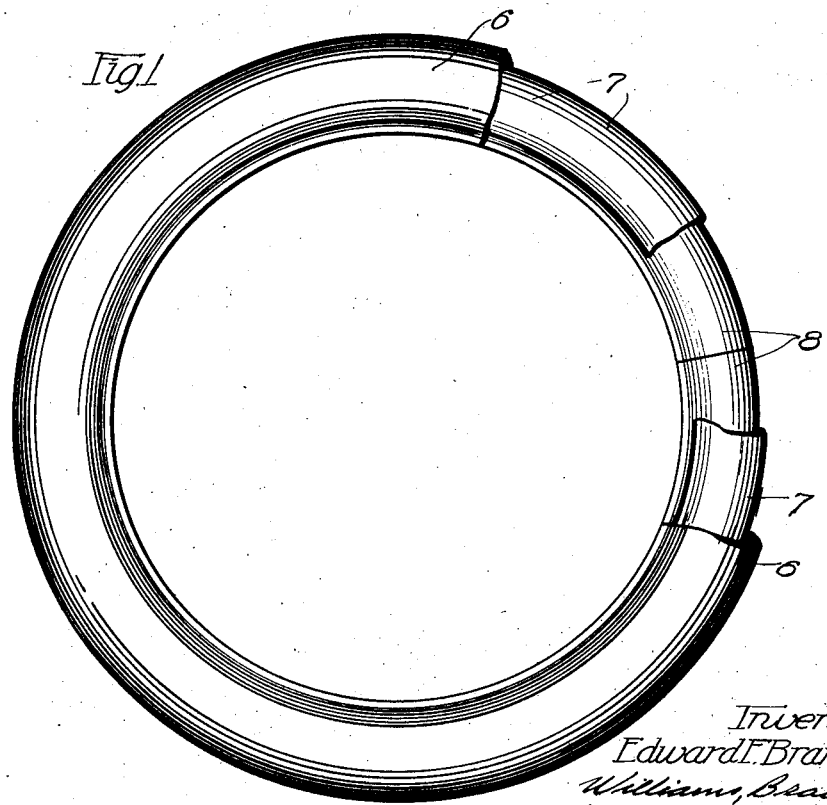
Inventor:
Edward F. Branen, Sr.
Williams, Bradbury,
Jas. McCalet Attys

UNITED STATES PATENT OFFICE.

EDWARD F. BRANEN, SR., OF ELGIN, ILLINOIS.

METHOD OF MAKING TIRE-FILLERS.

1,389,093.      Specification of Letters Patent.      Patented Aug. 30, 1921.

Application filed August 9, 1920. Serial No. 402,076.

*To all whom it may concern:*

Be it known that I, EDWARD F. BRANEN, Sr., a citizen of the United States, residing at Elgin, in the county of Kane and State of Illinois, have invented a certain new and useful Improvement in the Method of Making Tire-Fillers, of which the following is a full, clear, concise, and exact description, reference being had to the accompanying drawing, forming a part of this specification.

My invention relates to automobile tires and particularly to a method of making tire fillers and the product thereof which results in an economical and efficient article of manufacture, sale, and use.

The object of my invention is to provide a tire filler which can be put into ordinary casings under the same pressure as that most desirable for the air in air filled tires and at the same time to provide combinations of filler parts such that the desired pressure may be obtained in any of the different size tires without it being necessary for the dealer to carry in stock the same number of fillers as there are different sizes of tires. To this end I provide the filler in two parts, each preferably of sponge rubber, the outer parts being preferably vulcanized as an annulus and being of different sizes to fit different tires, while the inner part is preferably vulcanized in lengths and in only a few different sizes so that they may be combined with various sizes of outer annuli to make the proper pressure filler for all different sizes of tires.

There are twenty-two different sizes of automobile tires in general use and when the fact that different makes of tires of the same designated size have widely differing sized inner openings is taken into consideration, the number of sizes which must be provided is greatly increased. I have found, however, that I am able by the use of three different sizes of inner cores and ten different sizes and thickness of annuli, to provide the necessary quantity of material to give the proper pressure in any one of a very great number of tires.

My invention is illustrated in the accompanying drawings, in which—

Figure 1 is an elevation of a tire with a part of the casing cut away to show the relative locations of the filler; and Figs. 2, 3 and 4 are sections through tires showing the manner in which different amounts of filler are obtained by the use of a single core and different annuli.

In the accompanying drawing casings 6 are of usual construction as ordinarily inflated with air. Within these casings are laid annuli 7 preferably formed of sponge rubber, while still within these annuli are laid the cores 8 which are also preferably of sponge rubber. In assembling these within the casing the annulus 7 is first placed within the casing; thereafter a strip of core material about eight or ten inches greater in length than the circumference of the tire is crowded into the inner part of the annulus, thus causing the tire to spread materially at the inner and open side. One side of the tire is then placed on the rim and the other side in a press so built that it will squeeze the clenching portion 9 far enough on to the rim so that the ring for holding the tire on the rim may be put into place. The quantity of material making up the core 8 and the annulus 7 is so selected that when the press is released and the tire is held between the engaging portions of the rim a pressure of 60 to 80 pounds is maintained on the sponge rubber so that the tire is held under the same expansive pressure as is intended when the tire is inflated with air.

By the use of my invention a dealer may be supplied with cores 8 in lengths sufficient for any size tire. It has been found in practice that if the core 8 is crowded into the annulus it is immaterial whether the core be in a single piece or in several pieces, but it has also been found preferable that the annulus have no cut in it because, through the creeping action caused from the external kneading, there is a tendency on account of the high pressure under which the core is inserted for the core to work its way between the ends of the outer part and cause them to separate to such an extent that a noticeable depression may be caused in the casing. For this reason it is desirable that a suitably lengthened annulus be kept in stock for each sized casing but since these annuli are thin and light compared with the amount of rubber in the core, the actual weight of rubber which a dealer must keep in stock for fitting of sizes of tires is greatly reduced over what it would be if the dealer were compelled to maintain in stock a suitably sized complete filler for every tire.

In a co-pending application filed of even date herewith I have shown a mold for the protection of both annuli and cores.

Although I have described my invention with respect to the illustrated embodiment, it is to be understood that I do not wish to be unduly limited thereto, inasmuch as there are obvious deviations from this illustration which will not depart from the spirit or scope of my invention.

I claim:

1. A tire filler for rim closed tires comprising a core member having a portion for supporting the rim and an enlarged portion following the general contour of the inner wall of the tire casing, but spaced therefrom, except in the region of the rim, by different amounts gradually tapering from the greatest space opposite the tire tread to points near the rim portion of the casing, where the space disappears, and a resilient member having a normal cross section of substantially the same shape as the space between the core and the inner wall of the casing, said member being crowded into the space between the core and the casing under pressure when the tire is filled for use, different sizes of cores and resilient members being adapted to be used together for properly filling a variety of different sized casings.

2. A tire filler comprising a core member having a portion for supporting the rim and an enlarged portion following the general contour of the inner wall of a tire casing, but spaced therefrom, except adjacent the rim, by different amounts gradually tapering from the greatest space opposite the tire tread to points near the rim portion of the casing, where the space wholly disappears, and a more resilient member having a normal cross section of substantially the same shape as the space between the core and the inner wall of the casing, said member being crowded into the space between the core and the casing under pressure when the tire is filled for use.

3. In a filler for a tire casing having base beads for mounting the casing upon a flanged tire rim, a main core ring crescent shaped in cross section and arranged with its concave side inwardly, and an auxiliary core ring for filling the concavity and spreading the wings of the main core ring, the thin edges of the wings ending substantially at the outer edges of the base beads, where they are not subject to destructive deflections in use.

In witness whereof, I hereunto subscribe my name this 4th day of August, 1920.

EDWARD F. BRANEN, Sr.

Witnesses:
EDNA V. GUSTAFSON,
ALLEN C. AHLBERG.